US 8,534,411 B2

(12) United States Patent
Hirai

(10) Patent No.: US 8,534,411 B2
(45) Date of Patent: Sep. 17, 2013

(54) GENERAL-PURPOSE FRAME STRUCTURE FOR MOUNTING POWERPLANTS

(75) Inventor: Nobuyoshi Hirai, Okayama-ken (JP)

(73) Assignee: Basic Co., Ltd., Okayama-ken (JP)

( * ) Notice: Subject to any disclaimer, the term of this patent is extended or adjusted under 35 U.S.C. 154(b) by 0 days.

(21) Appl. No.: 13/497,086

(22) PCT Filed: Sep. 24, 2010

(86) PCT No.: PCT/JP2010/066564
§ 371 (c)(1),
(2), (4) Date: Mar. 20, 2012

(87) PCT Pub. No.: WO2011/037189
PCT Pub. Date: Mar. 31, 2011

(65) Prior Publication Data
US 2012/0267185 A1     Oct. 25, 2012

(30) Foreign Application Priority Data
Sep. 25, 2009   (JP) ................................. 2009-220892

(51) Int. Cl.
*B60K 1/00* (2006.01)

(52) U.S. Cl.
USPC ..................... 180/300; 180/298; 296/203.01

(58) Field of Classification Search
USPC ............ 180/291, 298, 299, 300; 296/203.01, 296/204, 205, 203.02, 203.04
See application file for complete search history.

(56) References Cited

U.S. PATENT DOCUMENTS

| 1,773,357 | A | * | 8/1930 | Griswold | ..................... | 244/131 |
|---|---|---|---|---|---|---|
| 3,115,945 | A | * | 12/1963 | Dry et al. | ..................... | 180/56 |
| 3,373,833 | A | * | 3/1968 | Sano | ..................... | 180/291 |
| 4,560,027 | A | * | 12/1985 | Murakami et al. | ............ | 180/312 |
| 5,882,064 | A | * | 3/1999 | Emmons | ................... | 296/193.04 |
| 6,540,284 | B2 | * | 4/2003 | Miyata | ..................... | 296/203.02 |
| 6,588,534 | B1 | * | 7/2003 | Daly | ............................ | 180/300 |
| 6,874,816 | B2 | * | 4/2005 | Herrmann et al. | ............ | 280/781 |
| 2005/0012362 | A1 | * | 1/2005 | Patberg et al. | ........... | 296/203.01 |
| 2006/0219462 | A1 |  | 10/2006 | Martin et al. | | |

FOREIGN PATENT DOCUMENTS

| JP | 62-144776 | 9/1987 |
|---|---|---|
| JP | 1987-144776 | 9/1987 |
| JP | 63-215469 | 9/1988 |
| JP | 06-18156 | 3/1994 |
| JP | 08-175191 | 7/1996 |
| JP | 2000-264075 | 9/2000 |
| JP | 2003-327154 | 11/2003 |
| JP | 2004-338421 | 12/2004 |
| JP | 2006-111111 | 4/2006 |
| JP | 2006-513082 | 4/2006 |

* cited by examiner

*Primary Examiner* — John Walters
(74) *Attorney, Agent, or Firm* — Clark & Brody

(57) ABSTRACT

A general-purpose frame structure to mount a powerplant to a car body includes four side frames having respective basal ends to be attached to a fore end of a cabin and adapted to extend in the fore-and-aft direction of the car body. Mounting devices are interposed between the side frames and the powerplant. The side frames have surfaces provided with a plurality of attachment openings arranged in a row at specific intervals. Side frame adjusters are configured to be interposed between the cabin and the side frames for adjusting the relative positions of the cabin and the side frames. The mounting devices are fitted, at the side of the side frames thereof, into two of the plurality of attachment openings, and mounting device adjusters are interposed between a powerplant-side connection portion and a side frame-side connection portion for adjusting the relative positions of the connection portions.

6 Claims, 16 Drawing Sheets

(a)
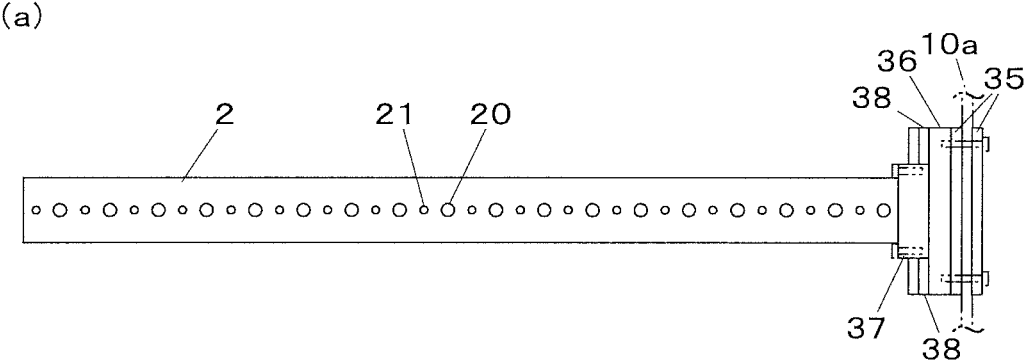
(b)
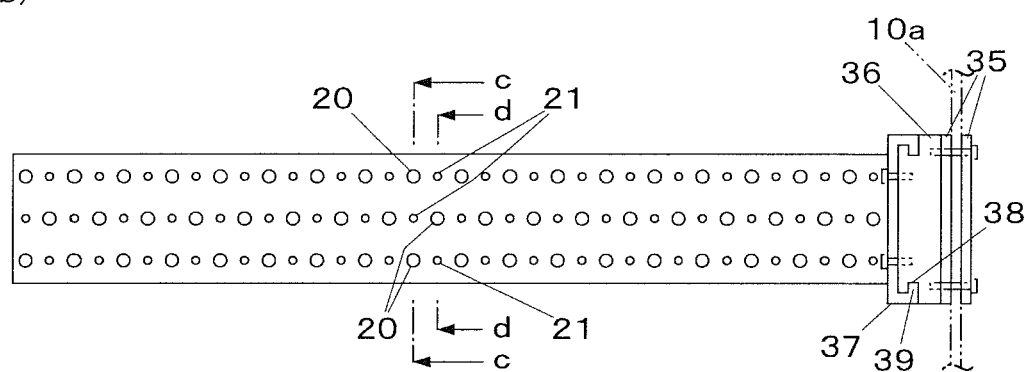
(c)
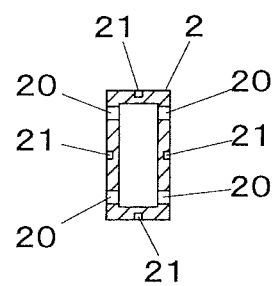
(d)
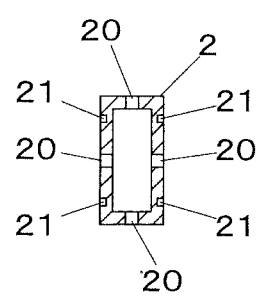
FIG. 4

(a)
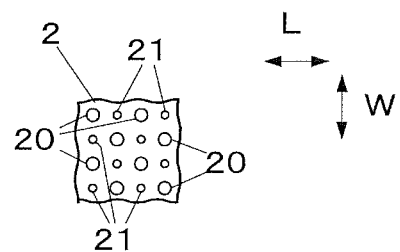
(b)
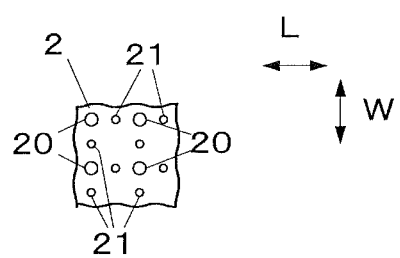
(c)
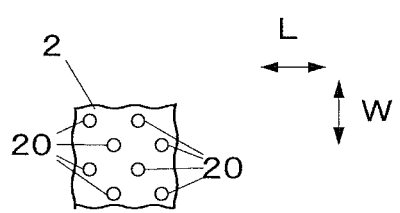
(d)
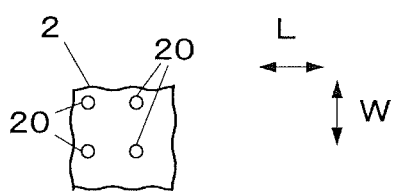
FIG. 5

(a)
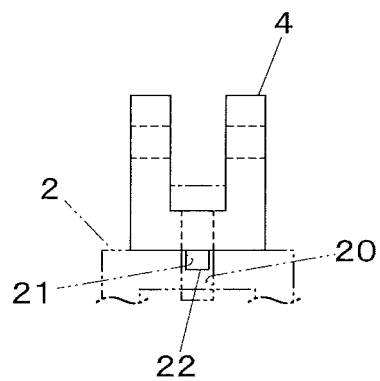
(b)
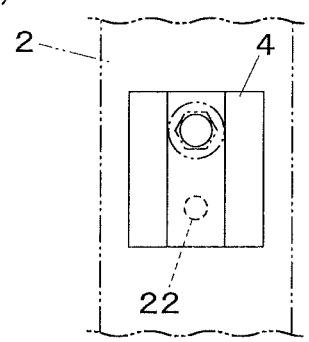
(c)
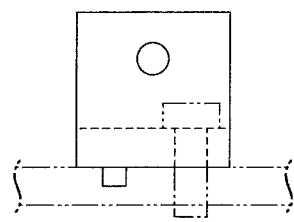
FIG. 6

GENERAL-PURPOSE FRAME STRUCTURE FOR MOUNTING POWERPLANTS

TECHNICAL FIELD

The present invention relates to general-purpose frame structures for mounting to car bodies any powerplants containing power sources and transmissions.

BACKGROUND ART

A sub-frame for mounting engines described in Patent Document 1 is exemplified as first background art relating to a frame structure for mounting powerplants. FIG. 15 depicts a sub-frame 103 having a substantially rectangular shape in plan view, which sub-frame is bridged across side frames of a car body so as to mount an engine. In the case where the sub-frame is to be constituted by crossing members 104 and 105 extending widthwise of the car and side members 106 and 107 extending in the fore-and-aft direction of the car body, a plenty of kinds with varied impact energy absorption performance is prepared for the side members 106 and 107, and side members 106 and 107 that are appropriately selected according to modification in the engine or transmission are combined with the crossing members 104 and 105.

A powerplant mounting structure described in Patent Document 2 is exemplified as second background art. As depicted in FIG. 16, this structure is adapted to mount a powerplant member X to the side of a car body with a powerplant supporting member 203 interposed therebetween. While a plurality of types is set for the powerplant member X so as to allow a mounting portion Y to be arranged to the car body side at varied positions in the fore-and-aft direction of the car body, an intermediate bracket 210 is fitted to the mounting portion Y, and the powerplant member X is mounted to the powerplant supporting member 203 with the intermediate bracket 210 interposed therebetween. A plurality of kinds is set for the intermediate bracket 210 with differentiated relative positions of the surface to be fixed to the side of the powerplant supporting member 203 and the surface to be fixed to the side of the mounting portion 205 in the fore-and-aft direction of the car body, so that appropriate one is selected according to the type of the powerplant member X.

PRIOR ART DOCUMENTS

Patent Document

[Patent Document 1] JP-A-08-175191
[Patent Document 2] JP-A-2000-264075

SUMMARY OF THE INVENTION

Problems to be Solved by the Invention

However, regarding the first background art, side members 106 and 107 have to be prepared according to the types of engines and transmissions. Further, for example, the outer diameters of engines and transmissions are limited within a range that could merely accommodate modification in the side members 106 and 107, and the art is thus not applicable to general purposes.

Regarding the second background art, mountable powerplants are limited to those that could merely involve modification in the intermediate bracket 210, and the art is thus not applicable to general purposes.

Means for Solving the Problems

In view of the foregoing circumstances, a general-purpose frame structure for mounting powerplants of the present invention is configured to mount a powerplant to a car body. The frame structure includes: four side frames having basal ends thereof to be attached to a fore end or a rear end of a cabin of the car body, the side frames being adapted to extend in a fore-and-aft direction of the car body on a substantially upper-left side, on a substantially lower-left side, on a substantially upper-right side, and on a substantially lower-right side of the powerplant; a plurality of mounting devices to be interposed between the side frames and the powerplant to support the powerplant to the four side frames; and a bracket for attaching, to an associated one of the side frames, a portion to be attached to the side frame in a link configured to couple the side frame with the cabin, a portion to be attached to the side frame in a link configured to couple the side frames to each other, or a portion to be attached to the side frame in a suspension to be installed to the side frame. The side frames have surfaces provided with a plurality of attachment openings arranged at specific intervals in a row in a length direction of the side frames, and side frame adjusters are configured to be interposed between the cabin and the side frames for adjusting relative positions of the cabin and the side frames. The mounting devices are each configured to be fitted, at the side of an associated one of the side frames, into one or two or more attachment openings of the plurality of attachment openings, and mounting device adjusters are each configured to be interposed between a powerplant-side connection portion to be connected to the powerplant and a side frame-side connection portion to be connected to an associated one of the side frames, for adjusting relative positions of the connections portions. The bracket is configured to be fitted into one or two or more attachment openings of the plurality of attachment openings.

This configuration allows for adjustment of the side frame adjusters and the mounting device adjusters, and for easy mounting of any powerplant to the car body by making use of the plurality of attachment openings. Further, the use of the plurality of attachment openings allows for easy attachment of the links and the suspensions to the side frames.

The general-purpose frame structure of the present invention is suitable for car bodies of a monocoque structure (also referred to as a stress-skin structure or a structural skin structure) that is adopted in most of the car body structures of automobiles except currently used buses. A reason therefor is that, in general automobiles with a monocoque structure, the outside sheathings themselves are strength members, and that floor pans, inner fenders, bulkheads (the partition between the powerplant and the driver's cab, i.e., the wall at the fore end or rear end of the cabin), pillars, roofs, and the like sustain stress. Thus, the general-purpose frame structure of the present invention is easily constructible by using as a basic structure the bulkhead, i.e., the wall at the fore end or the rear end of the cabin, serving as a strength member.

Needless to say, the following aspects are preferably taken into consideration in constructing the general-purpose structure of the present invention:
(1) In the case where the fore end or the rear end of the cabin lacks strength, the portion shall appropriately be reinforced.
(2) In the case of using the general-purpose frame structure of the present invention for wholly or partly replacement of the powerplant that has been mounted in an existing car body, of the members provided at the fore end or the rear end of the cabin of the existing car body, members that may interfere with the general-purpose frame structure of the present invention shall be removed or moved to other positions in advance.

As the general-purpose frame structure for mounting powerplants, a mode is exemplified in which the mounting device adjusters have spacers to be interposed between the powerplant-side connection portions and the side frame-side connection portions, in such a manner that the relative positions of the powerplant-side connection portions and the side frame-side connection portions are changeable according to the spacers.

This configuration allows for easy adjustment of the relative positions of the powerplant-side connection portions and the side frame-side connection portions according to the powerplant.

As the general-purpose frame structure for mounting powerplants, a mode is exemplified in which the side frame adjusters have spacers to be interposed between the cabin and the side frames, in such a manner that the relative positions of the cabin and the side frames are changeable according to the spacers.

This configuration allows for easy adjustment of the relative positions of the cabin and the side frames according to the powerplant.

As the general-purpose frame structure for mounting powerplants, a mode is exemplified in which the side frame adjusters are configured to adjust the positions of the side frames in a width direction of the car body.

This configuration allows for supporting of the side frames against the car body at optimal positions according to the powerplant.

As the general-purpose frame structure for mounting powerplants, a mode is exemplified in which the side frame adjusters have shafts adapted to extend in a direction substantially perpendicular to the fore-and-aft direction of the car body, in such a manner that the side frames are angularly adjustable about the shafts.

This configuration allows for supporting of the side frames against the car body at an optimal angle according to the powerplant.

As the general-purpose frame structure for mounting powerplants, a mode is exemplified in which the frame structure further includes coupling members for coupling leading ends of the plurality of side frames to each other.

This configuration allows for integration of the plurality of side frames and thus construction of a solid frame structure.

Effects of the Invention

The general-purpose frame structure for mounting powerplants of the present invention provides a favorable effect of allowing any powerplant to be easily mounted to a car body.

BRIEF DESCRIPTION OF THE DRAWINGS

FIGS. 4(a) to (d) depict a side frame of the frame structure, where FIG. 4(a) is a plan view thereof, FIG. 4(b) is a right-hand side view thereof, FIG. 4(c) is a cross-sectional view taken along Line c-c of FIG. 4(b), and FIG. 4(d) is a cross-sectional view taken along Line d-d of FIG. 4(b).

FIGS. 5(a) to (d) depict modifications of the side frame.

FIGS. 6(a) to (c) depict a bracket of the frame structure, where FIG. 6(a) is a front view thereof, FIG. 6(b) is a plan view thereof, and FIG. 6(c) is a right-hand side view thereof.

FIG. 7(a) is a plan view thereof.

FIG. 9(a) is a plan view thereof.

FIG. 10(a) is a front view thereof, FIG. 10(b) is a right-hand side view thereof, and FIG. 10(c) is a right-hand side view of a case in which change is made to use a spacer with a larger thickness.

MODES FOR CARRYING OUT THE INVENTION

Figure 1:
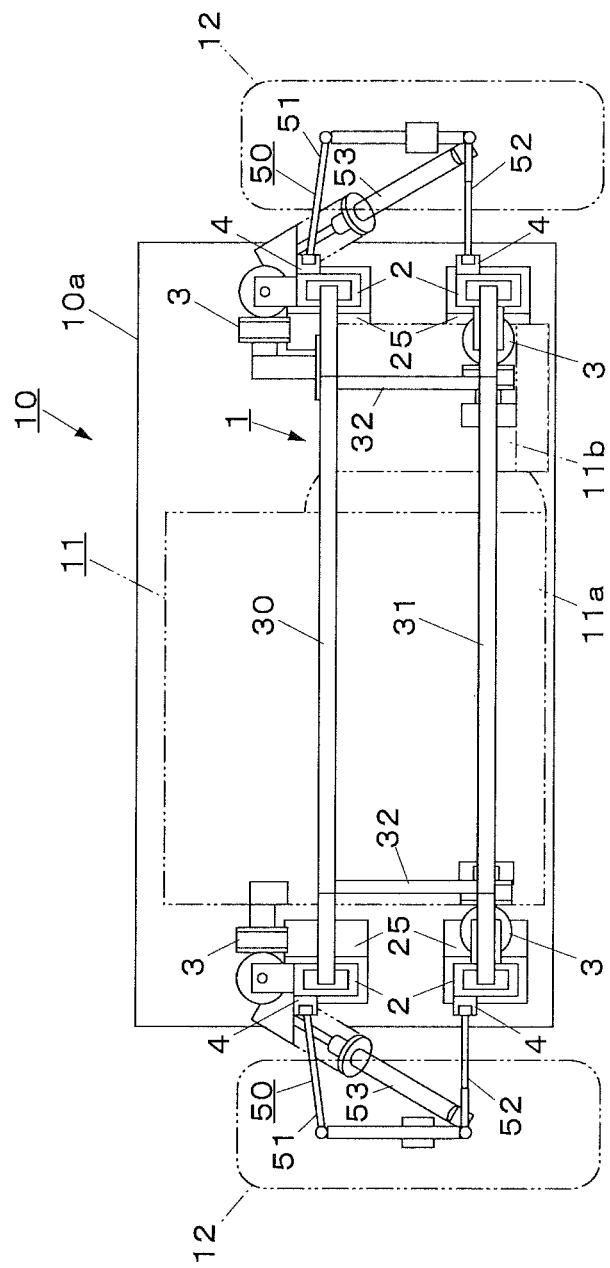
FIG. 1 is a front view of a general-purpose frame structure for mounting powerplants according to a first embodiment embodying the present invention.
Figure 2:
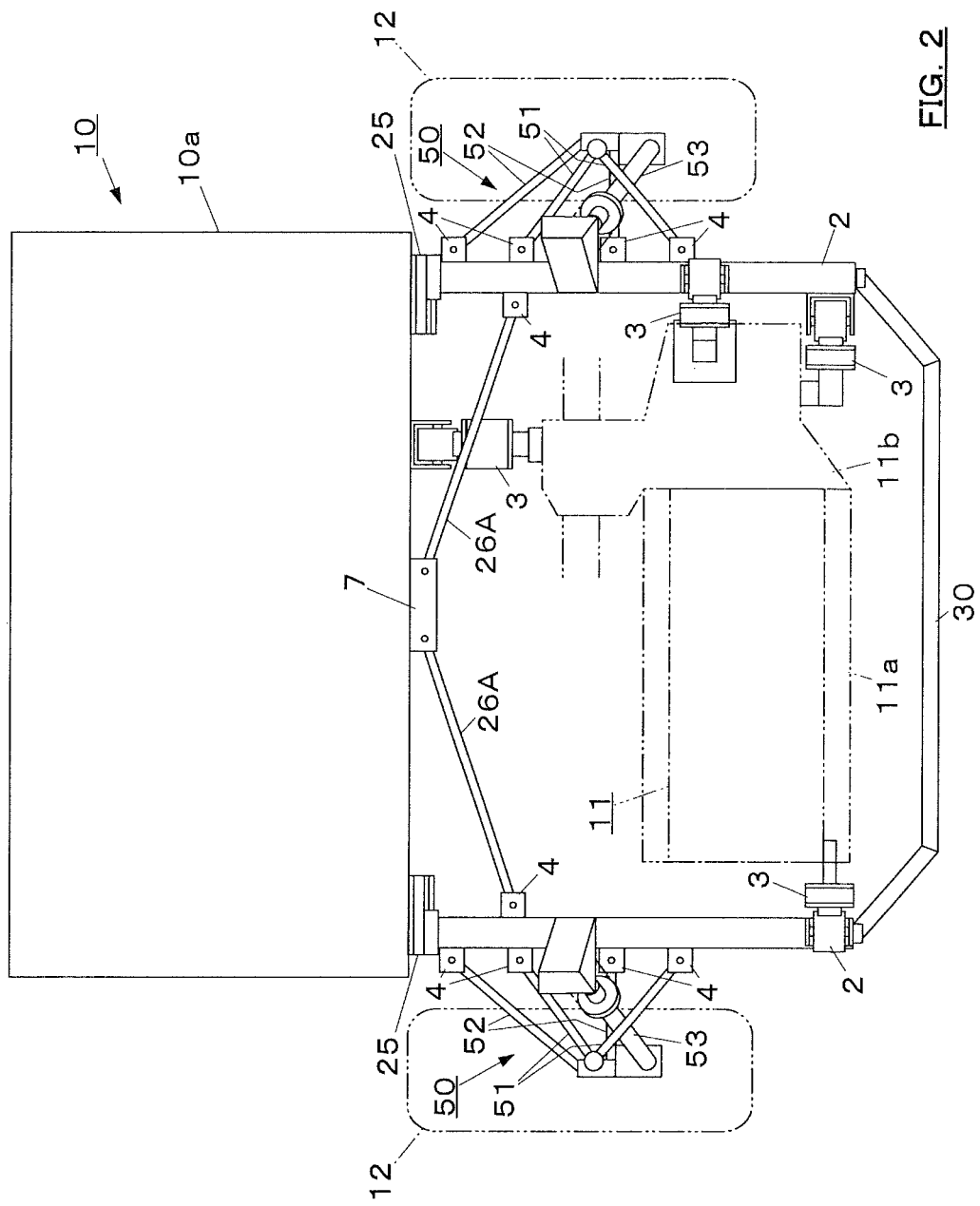
FIG. 2 is a plan view of the frame structure.
Figure 3:
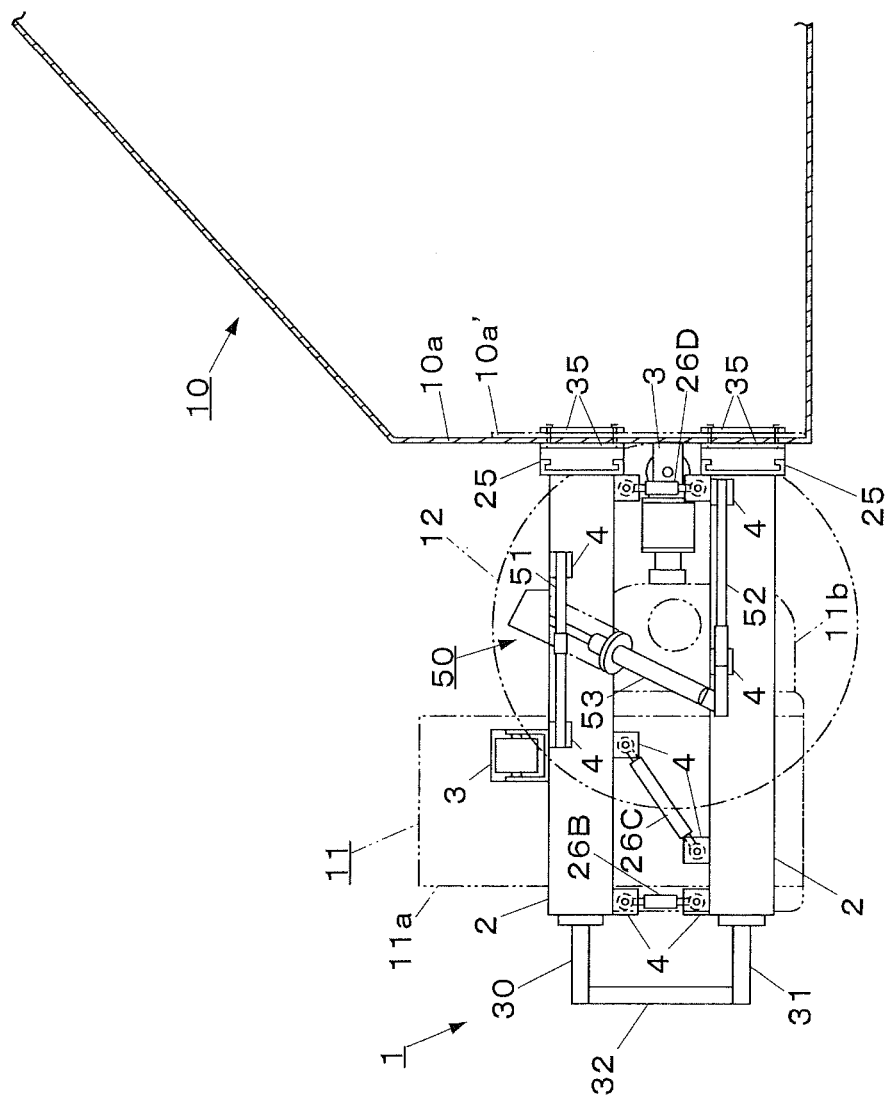
FIG. 3 is a right-hand side view of the frame structure.
Figure 7:
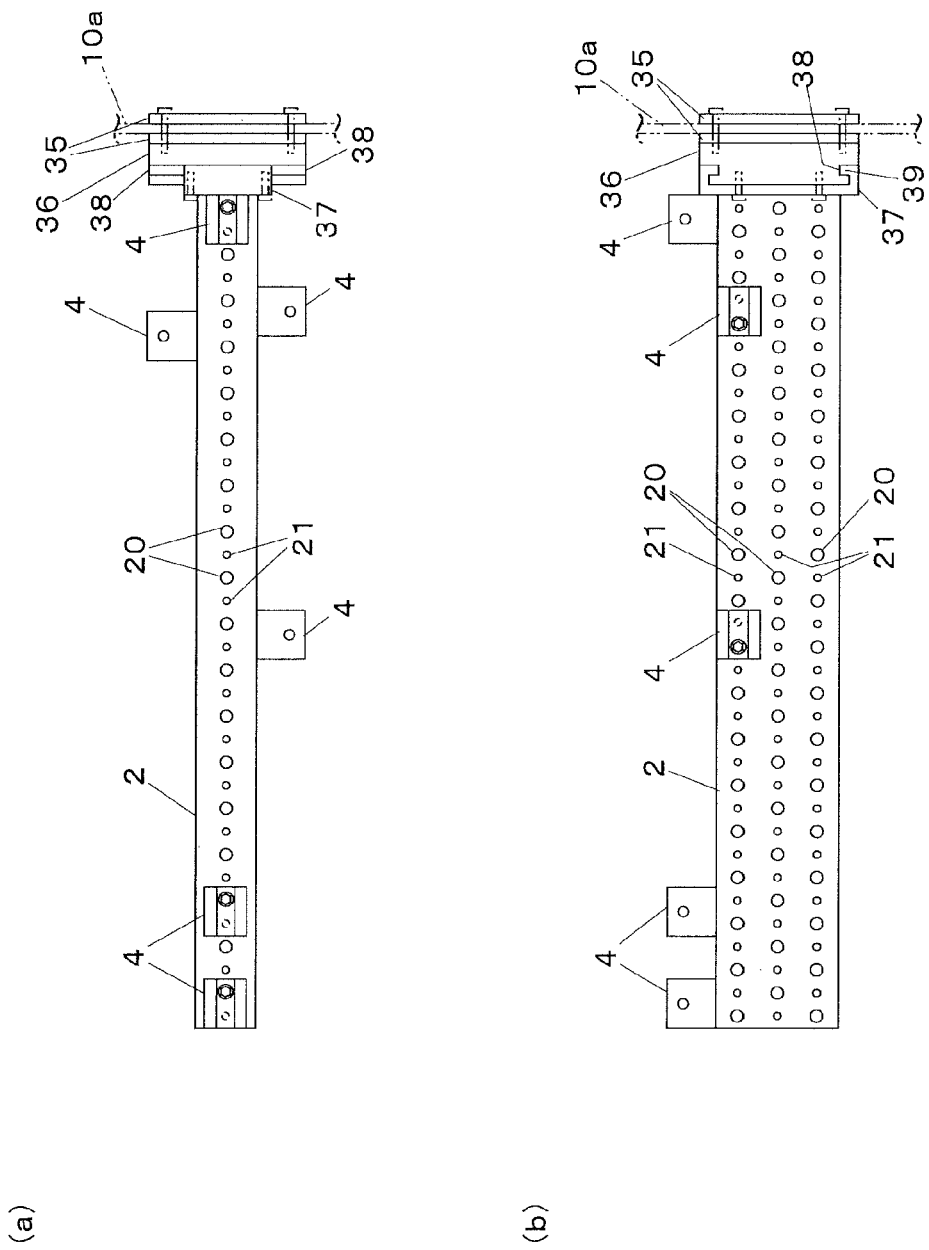
FIGS. 7(a) and (b) depict a state in which the bracket is attached to the side frame, where
FIG. 7(b) is a right-hand side view thereof.

FIGS. 1 to 10(c) depict a general-purpose frame structure for mounting powerplants according to a first embodiment embodying the present invention. As depicted in FIGS. 1 to 3, a general-purpose frame structure 1 is configured to mount any powerplant 11 to a car body 10. The frame structure 1 has their basal ends attached to a fore end of a cabin 10a of the car body 10. The frame structure 1 includes four side frames 2 that extend in the fore-and-aft direction of the car body at the substantially upper-left, lower-left, upper-right, and lower-right sides of the powerplant 11, and a plurality of mounting devices 3 that are interposed between the side frames 2 and the powerplant 11 so as to support the powerplant 11 against the four side frames 2. The car body 10 of the present embodiment is configured in a front engine/front-wheel drive (FF) type where the powerplant 11 installed on the front side drives front wheels 12.

The fore end of the cabin 10a of the car body 10 constitutes a basic part for constructing the general-purpose frame structure 1. In the case where this portion lacks strength, the portion is preferably reinforced in a suitable manner Exemplary reinforcing methods include providing reinforcing members at the inner side and/or outer side of the fore end of the cabin 10a for reinforcement. More specifically, the interior portion of the fore end of the cabin 10a may be reinforced with a reinforcing panel 10a' serving as a reinforcing member, as virtually indicated by the chain double-dashed line in FIG. 3.

In the present embodiment, the four side frames 2 are arranged at longitudinally symmetric positions and laterally symmetric positions as seen from the front of the car body 10. Moreover, in the present embodiment, the mounting devices 3 are installed between the upper-left side frame 2 and an upper-left portion of the foreside of the engine 11a in the powerplant 11, between the lower-left side frame 2 and a lower-left potion of the foreside of the engine 11a in the powerplant 11, between the upper-right side frame 2 and a rear portion of the top of a transmission 11b in the powerplant 11, between the lower-right side frame 2 and a lower-right portion of the foreside of the transmission 11b in the powerplant 11, and between the cabin 10a and a lower portion of the rear side of the transmission 11b in the powerplant 11, as seen from the front of the car body 10.

As depicted in FIGS. 4(a) to (d), the side frames 2 are made of steel in a quadrangular shape. Side frame adjusters 25 are interposed between the cabin 10a and the side frames 2 to adjust the relative positions of the cabin 10a and the side frames 2. Multiple attachment openings 20 are arranged at specific intervals in a row on the respective surfaces of the side frames 2, i.e., the top surfaces, the bottom surfaces, and the right and left side surfaces, in the length direction of the side frames 2. The attachment openings 20 of the present embodiment are provided in the form of internally threaded holes. In the present embodiment, the multiple attachment openings 20 in the top surfaces (or the bottom surfaces) of the side frames 2 are arranged in one row along the length direction of the side frames 2; however, as in the side surfaces of the side frame 2, the attachment openings may be arranged in a plurality of rows depending on the width of the top surfaces (or the bottom surfaces) of the side frames 2. Recesses 21 (holes may also do) are provided in the vicinity of the attachment openings 20 such that projections 22 provided on to-be-attached members fit in the recesses 21. These recesses 21 and the projections 22 act as anti-rotation means for the to-be-attached members. The anti-rotation means is not limited thereto, and other appropriate methods may also be adopted; for example, projections may be provided in the vicinity of the attachment openings 20 and recesses (holes may do also) to receive the projections may be provided on the to-be-attached members, or one to-be-attached member may be fitted to a plurality of attachment openings 20 without using the recesses 21.

The arrangement of the multiple attachment openings 20 and the recesses 21 to be provided in the surfaces of the side frames 2 may be appropriately altered as depicted in FIGS. 5(a) to (d). FIG. 5(a) depicts a mode in which attachment openings 20 and recesses 21 are arranged alternately and at equidistances in the length direction L as well as the width direction W of the side frames 2. FIG. 5(b) depicts a mode in which attachment openings 20 are arranged at equidistances in the length direction L as well as the width direction W of the side frames 2, and recesses 21 are arrayed between adjacent attachment openings 20 arranged in the length direction L and the width direction W of the side frames 2. FIG. 5(c) depicts a mode in which the recesses 21 depicted in FIG. 5(a) are not provided. FIG. 5(d) depicts a mode in which the recesses 21 depicted in FIG. 5(b) are not provided.

The side frame 2 extending on the substantially upper-left side and the side frame 2 extending on the substantially upper-right side are coupled to each other by a lateral bar 30 with leading ends thereof leaded substantially laterally. The side frame 2 extending on the substantially lower-left side and the side frame 2 extending on the substantially lower-right side are coupled to each other by a lateral bar 31 with leading ends thereof leaded substantially laterally. These lateral bars 30 and 31 are coupled to each other by a pair of right and left longitudinal bars 32 extending longitudinally. In this manner, the plurality of side frames 2 have their leading ends coupled to each other by the bars 30, 31, and 32 serving as coupling members.

The side frame adjusters 25 each include a base portion 35 to be attached to the cabin 10a, a spacer portion 36 to be attached to the front surface of the base portion 35, a slide portion 37 to be attached to the front surface of the spacer portion 36. The basal ends of the side frames 2 are allowed to be attached to the front surfaces of the slide portions 37. The spacer portions 36 have a thick plate shape with a thickness along the fore-and-aft direction of the car body, and the relative positions of the cabin 10a and the side frames 2 are adapted to be altered correspondingly with respect to the thickness. The spacer portions 36 and the slide portions 37 are each provided with a guide groove 38 extending in the width direction of the car body and a slider 39 slidably fitted in along the guide groove 38 in a relative fashion. Bolts are used as fixing means for fixing, in a slidingly adjustable manner, the positions of the slide portions 37 relative to the spacer portions 36 in the width direction of the car body, i.e., the positions of the side frames 2 relative to the car body 10 in the width direction of the car body. As depicted in FIGS. 9(a) and (b), the side frame adjusters 25 may each be configured such that the inclination angle with respect to the longitudinal direction of a side frame 2 is adjustable about a shaft 40 extending in a direction substantially perpendicular to the fore-and-aft direction of the car body and also in the substantially horizontal direction. Thus, the relative positions among the members may be appropriately adjusted by the side frame adjusters 25 according to the structures of, for example, the car body 10 and the powerplant 11.

As depicted in FIGS. 10(a) to (c), the mounting device 3 of the present embodiment each include a mounting device adjuster 43 and a damper portion 44 interposed between a powerplant-side connection portion 41 to be connected to the powerplant 11 and a side frame-side connection portion 42 to be connected to the side frames 2, where the mounting device adjuster 43 is configured to adjust the relative positions of the connection portions and the damper portion 44 is configured to prevent transmission of vibration between the connection portions. FIGS. 10(a) to (c) depict a mounting device 3 that is installed between the upper-left side frame 2 and an upper-left portion of the foreside of the engine 11a in the powerplant 11 as seen from the front of the car body 10. The mounting device adjusters 43 of the present embodiment are spacer portions, have a thick plate shape with a desired thickness, and are configured such that the relative positions between the connection portions are changeable according to the thickness. Joint parts with the powerplant 11 in the powerplant-side connection portion 41 are prepared according to the type of the powerplant 11. The damper portions 44 each include an internal shaft 46 and an outer casing 47 with an insulator 45 of a rubbery elastic body disposed therebetween, where the internal shaft 46 is connected to the side frame-side connection portion 42 and the outer casing 47 is connected to the mounting device adjuster 43. The side frame-side connection portions 42 are each configured so as to be fitted to two attachment openings 20 of the multiple attachment openings 20. For example, the side frame-side connection portions 42 may each be fitted to one attachment opening 20 of the multiple attachment openings 20 and also have an anti-rotation projection 22 to be fitted into a recess 21 in the vicinity of the attachment opening 20. The powerplant-side connection portions 41 are prepared to correspond to preexisting to-be-supported portions provided according to the type of the powerplant 11 and are connected by a connection method suitable for the to-be-supported portions.

As depicted in FIGS. 4(a) to 7(b), the general-purpose frame structure 1 of the present embodiment includes brackets 4 for coupling, to the associated side frames, portions to be attached to the side frames 2 in links 26 to couple the side frames 2 with the cabin 10a, portions to be attached to the side frames 26 in the links 26 to couple the side frames 2 to each other, or portions to be attached to the side frames 26 in suspensions 50.

As depicted in FIGS. 6(a) to (c), the brackets 4 of the present embodiment each have a channel shape in cross section with a pair of parallel sidewalls 5 and a bottom wall 6 connecting the lower ends of the sidewalls 5. The paired parallel sidewalls 5 are each provided with a hole 5a for pivotally attaching a to-be-attached portion as mentioned above by using pivotally attaching means, e.g., a bolt and a nut. The bottom wall 6 is provided with a hole 6a to allow a bolt to be fastened therethrough into an attachment opening 20 in a side frame 2 and a projection 22 to fit into a recess 21 in the side frame 2. A plurality of kinds of brackets 4 is prepared wherein the holes 6a and the projections 22 in the bottom walls 6 positionally vary according to the orientations of the brackets when attached to the side frames 2. FIGS. 7(a) and (b) depict examples in which the brackets 4 are fitted so as to constitute a side frame 2 on the lower-right side as seen from the front of the car body 10.

Figure 8:
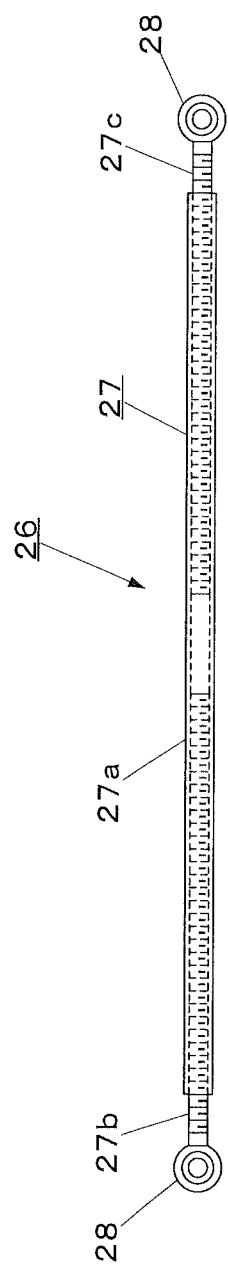
FIG. 8 is a plan view of a link of the frame structure.
Figure 9:
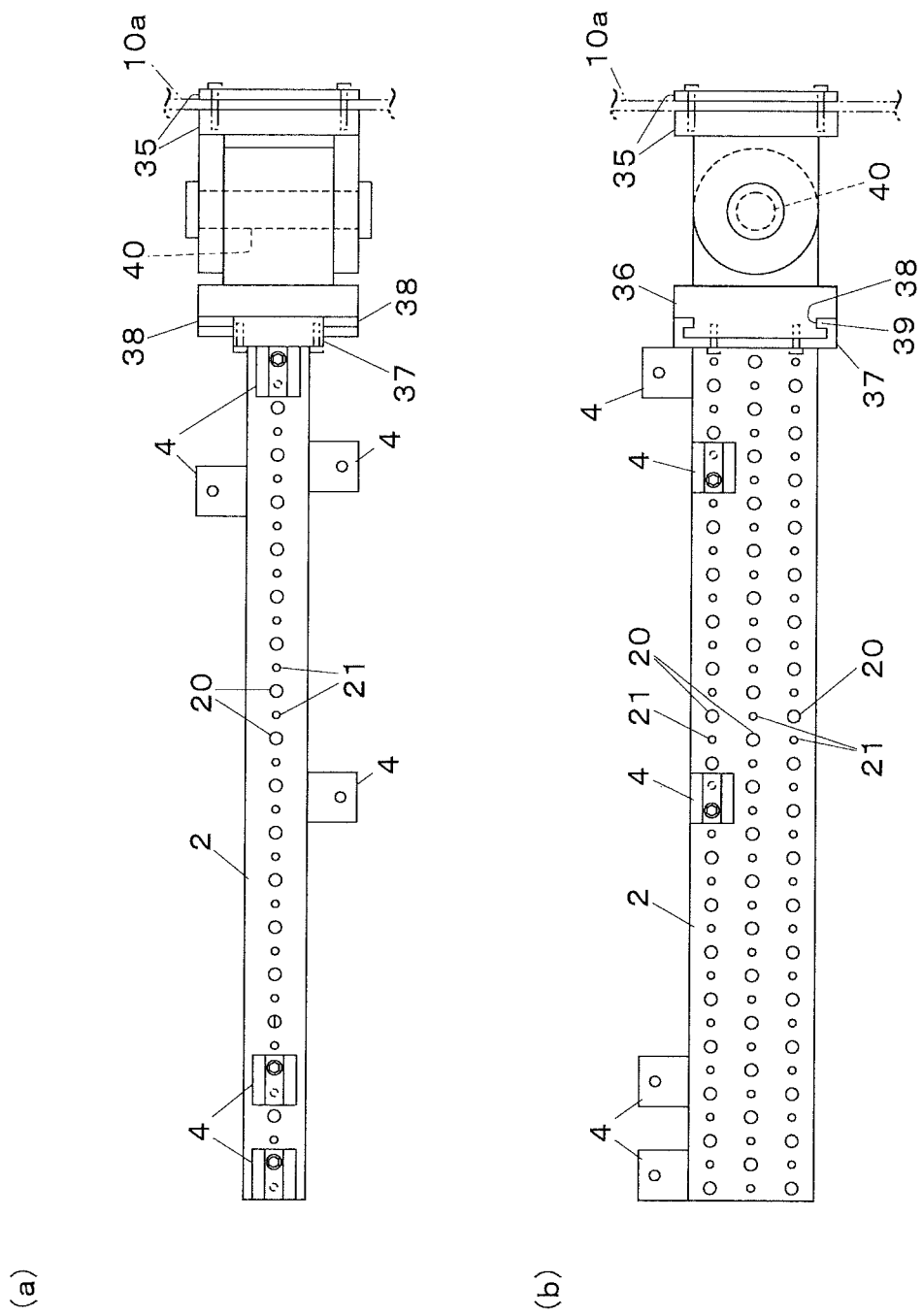
FIGS. 9(a) and (b) depict a state in which the bracket is attached to the side frame according to a modification, where
FIG. 9(b) is a right-hand side view thereof.
Figure 10:
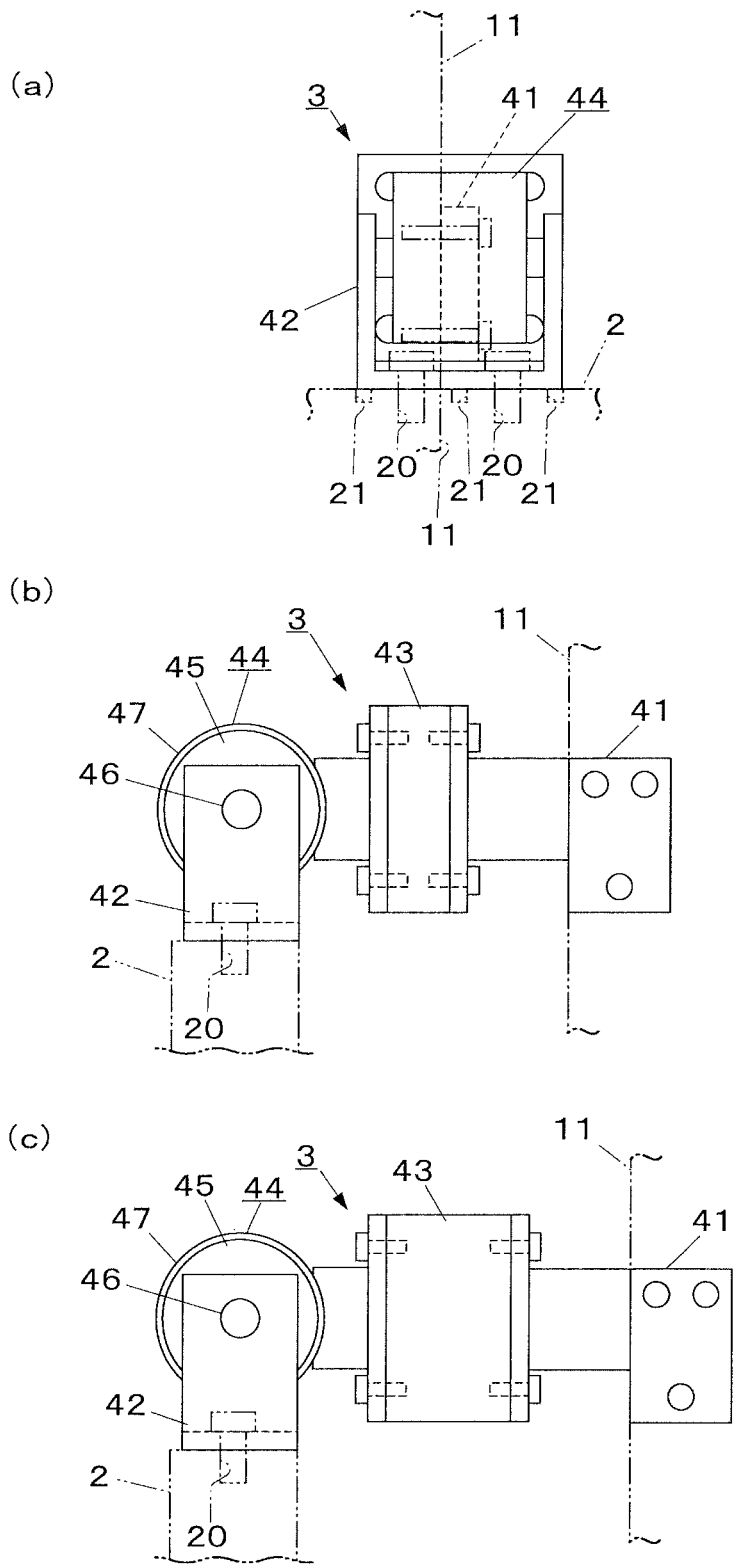
FIGS. 10(a) to (c) depict a mounting device of the frame structure, where
Figure 11:
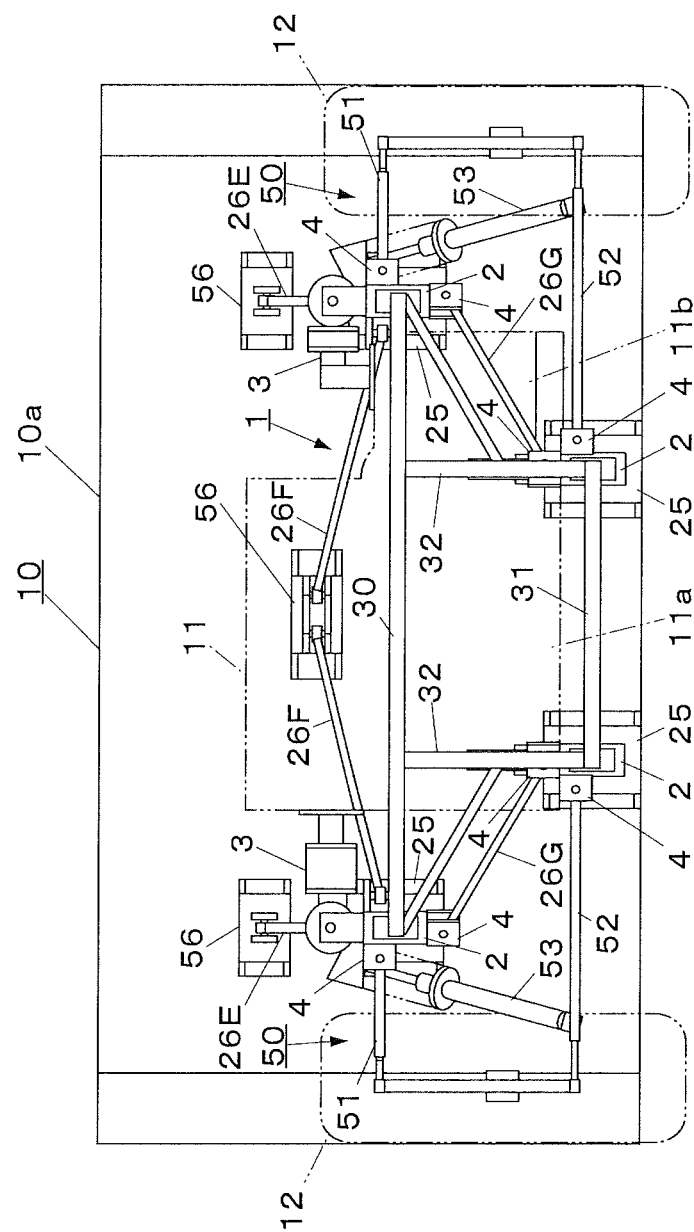
FIG. 11 is a front view of a general-purpose frame structure for mounting powerplants according to a second embodiment embodying the present invention.
Figure 12:
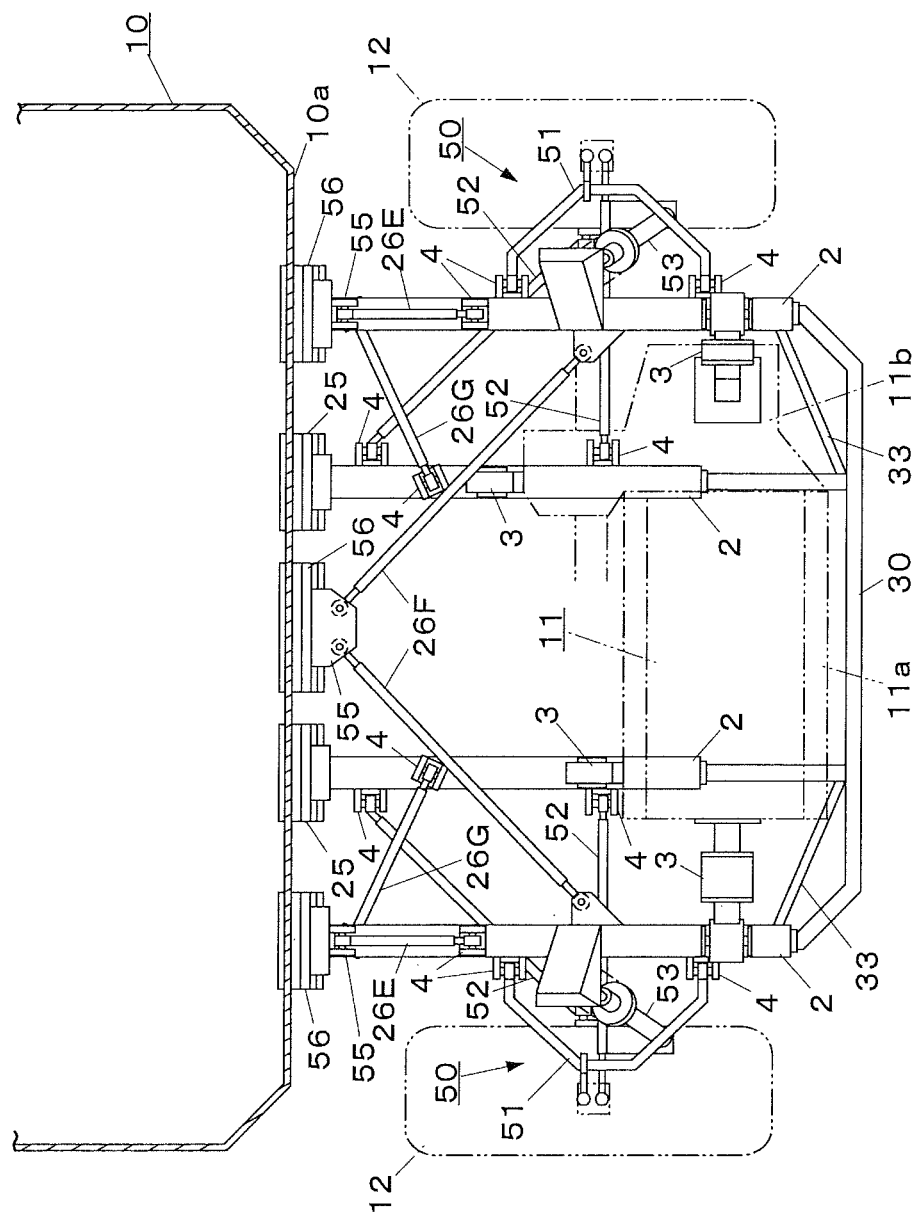
FIG. 12 is a plan view of the frame structure.
Figure 13:
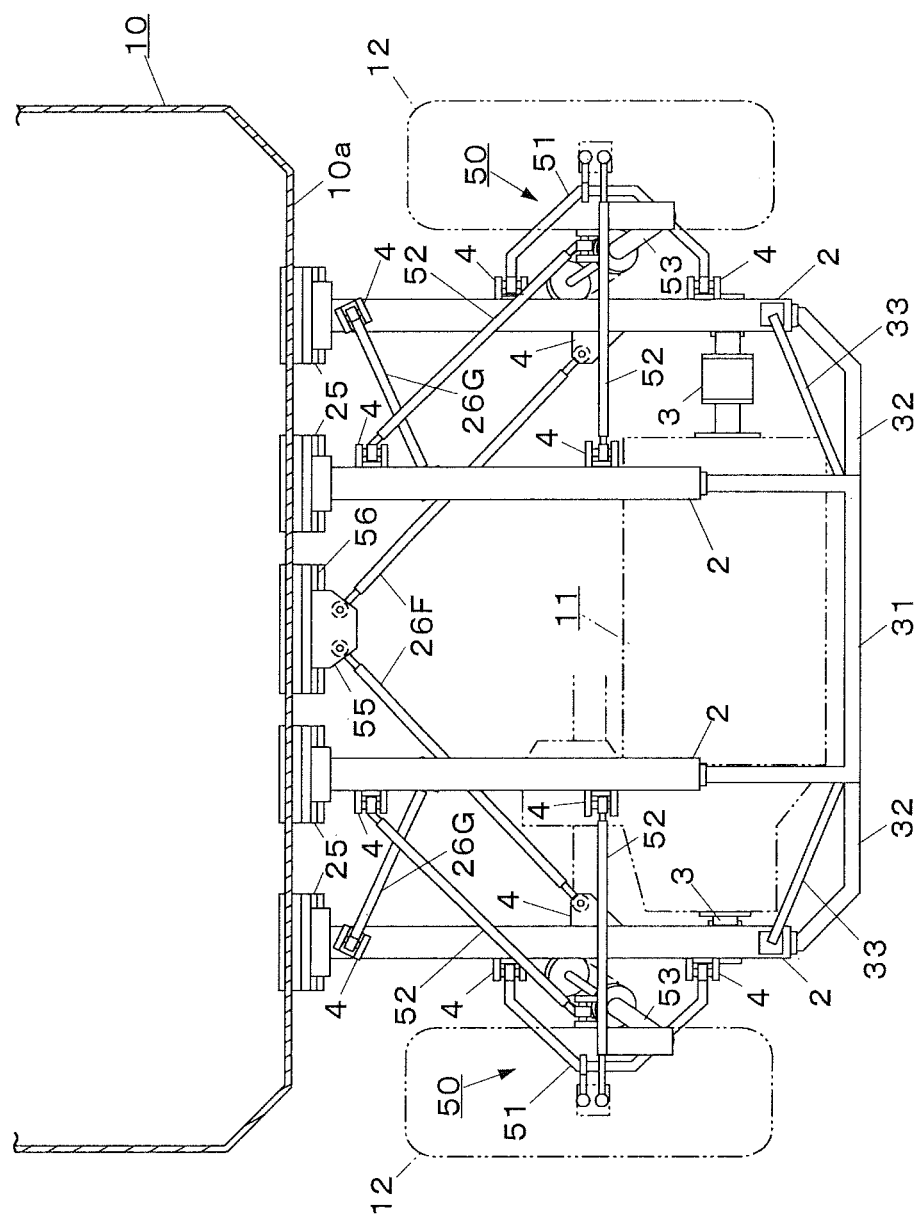
FIG. 13 is a bottom view of the frame structure.
Figure 14:
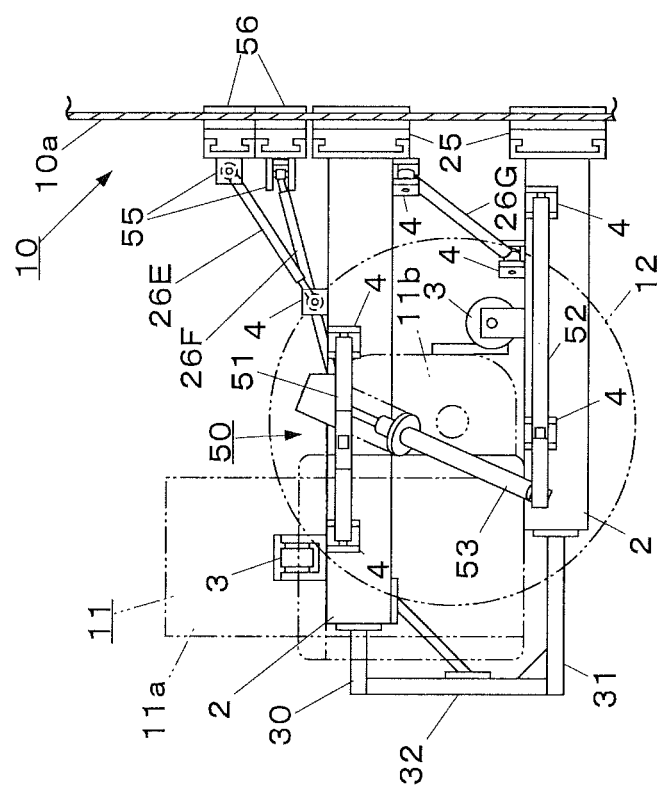
FIG. 14 is a right-hand side view of the frame structure.
Figure 15:
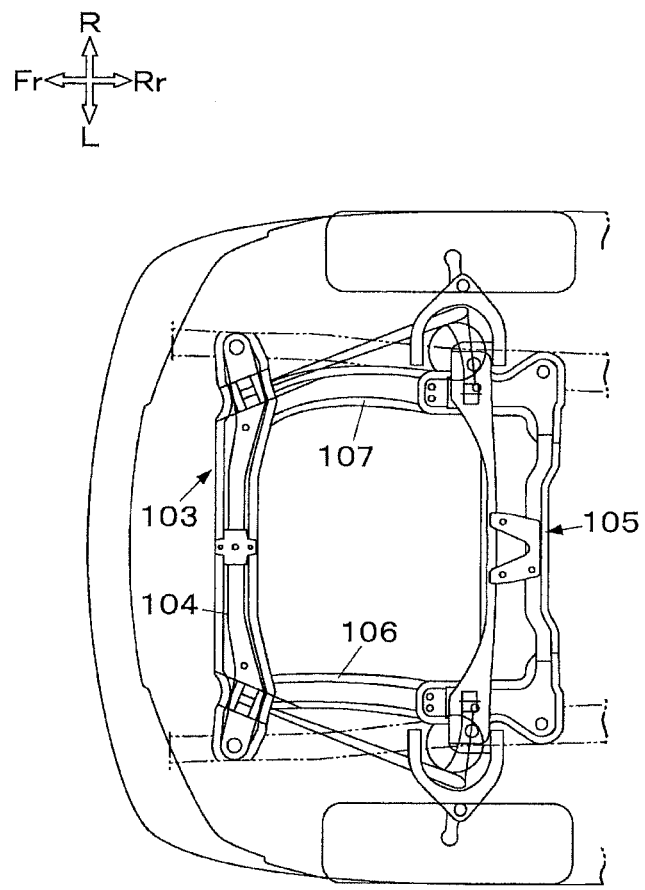
FIG. 15 is a plan view depicting a frame structure of the first background art.
Figure 16:
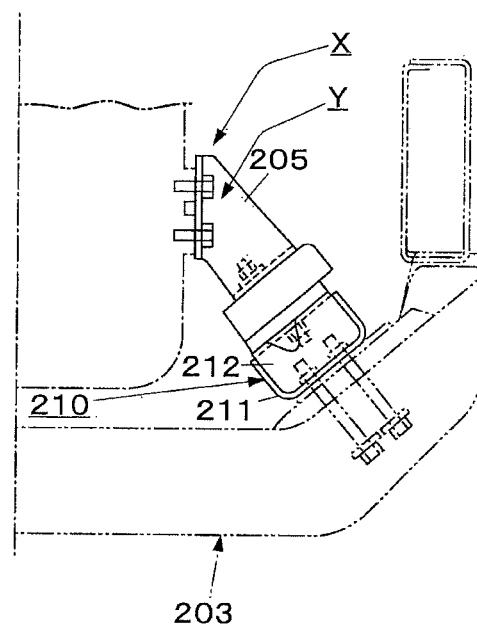
FIG. 16 is a front view of a frame structure of the second background art.

As depicted in FIG. 8, the links 26 of the present embodiment have a configuration such that a turnbuckle portion 27 has at its ends spherical slide bearing portions 28 attached thereto. The turnbuckle portion 27 includes a pipe portion 27a and a pair of external threads 27b and 27c, where the ends of the pipe portion 27a have openings that are internally threaded in reverse directions and the external threads 27b and 27c are screwed onto these internal threads, respectively. The spherical slide bearing portions 28 are configured to be pivotally fitted into the holes 5a in the brackets 4. The links 26 have a configuration such that the external threads 27b and 27c in pair come close to each other or are moved away from each other corresponding to the direction of rotation of the pipe portion 27a, thus allowing for adjustment of the length of the links 26. Further, the spherical bearing portions 28 allow the links 26 of the present embodiment to incline relative to the turnbuckle portions 27 serving as the link bodies, at the side where the spherical slide bearing portions 28 are pivotally attached to the brackets 4, which is user-friendly. In the present embodiment, the side frames 2 on the upper side have intermediate portions thereof in the fore-and-aft direction of the car body supported inwardly in the width direction of the car body in such a manner as to be drawn by links 26A attached to the cabin 10a. Further, the side frames 2 on the lower side of the present embodiment have intermediate portions thereof in the fore-and-aft direction of the car body supported in such a manner as to be suspended by links 26B, 26C, and 26D attached to the side frames 2 on the upper side. In the present embodiment, portions of the links 26A on the side of the cabin 10a are attached to the cabin 10a by a bracket 7.

As depicted in FIGS. 1 to 3, the suspensions 50 of the present embodiment each include an upper arm 51, a lower arm 52, and a shock absorber 53 and may be fitted by the brackets 4 at the fore-and-aft pair of basal ends of the upper arm 51, the fore-and-aft pair of basal ends of the lower arm 52, and the upper end of the shock absorber 53. The suspensions 50 of the present embodiment are merely an example, and suspensions 50 having another structure may also be adopted. In that case, the brackets 4 adapted to the to-be-attached portions on the suspensions 50 having the another structure are fitted in the attachment openings 20 in the side frames 2.

In the general-purpose frame structure 1 for mounting powerplants of the present embodiment thus configured allows for adjustment of the side frame adjusters 25 and the mounting device adjusters 43, as well as for easy mounting of any powerplant 11 to the car body 10 by making use of the multiple attachment openings 20.

Further, the frame structure includes the brackets 4 for attaching, to any of the associated side frames 2, a portions to be attached to the side frame 2 in a link 26 to couple the side frame 2 with the cabin 10a, a portion to be attached to the side frame 2 in a links 26 to couple side frames 2 to each other, or a portion to be attached to the side frame 2 in a suspension 50 to be installed to the side frame 2. The brackets 4 are each configured to be fitted to one or two or more of the multiple attachment openings 20. This configuration allows for easy attachment of the links 26 or the suspensions 50 to the side frames 2.

Moreover, the side frame adjusters 25 have the spacer portions 36 interposed between the cabin 10a and the side frames 2, and the relative positions of the cabin 10a and the side frames 2 are changeable in association with the spacer portions 36. This configuration allows for easy adjustment of the relative positions of the cabin 10a and the side frames 2 according to the powerplant 11.

The mounting device adjusters 43 are spacer portions to be interposed between the powerplant-side connection portions 41 and the side frame-side connection portions 42, and the relative positions of the powerplant-side connection portions 41 and the side frame side-connection portions 42 are changeable in association with the spacer portions. This configuration allows for easy adjustment of the relative positions according to the powerplant 11.

The side frame adjusters 25 may also have a configuration such that the angles of the side frames 2 are adjustable about a shaft 40 extending in a direction perpendicular to the fore-and-aft direction of the car body. Such a configuration allows for supporting of the side frames 2 against the car body 10 at an optimal angle according to the powerplant 11.

The side frame adjusters 25 are configured to slidingly adjust the positions of the side frames 2 in the width direction of the car body, which allows for supporting of the side frames 2 against the car body 10 at optimal positions according to the powerplant 11.

Since coupling members, i.e., the bars 30, 31, and 32, are provided to couple the leading ends of the plurality of side frames 2 to each other, the plurality of side frames 2 is integratable, so as to construct a frame structure with higher strength.

Next, FIGS. 11 to 14 depict a second embodiment embodying the present invention. The general-purpose frame structure 1 for mounting powerplants is different from the first embodiment mainly in the following points. Hence, like reference numerals are assigned to portions in common with the first embodiment so as to avoid redundant description.

In the present embodiment, the positional relationship among the four side frames 2 as seen from the front of the car body is set such that the distance between a pair of right and left side frames 2 on the upper side is smaller than the distance between a pair of right and left side frames 2 on the lower side. Further, the length of the pair of side frames 2 on the upper side is shorter than the length of the pair of side frames 2 on the lower side. Moreover, in the present embodiment, the mounting devices 3 are installed between the upper-left side frame 2 and an upper-left portion of the foreside of the engine 11a in the powerplant 11 and between the lower-left side frame 2 and a lower-left portion of the rear side of the engine 11a in the powerplant 11 as seen from the front of the car body 10, and between the upper-right of the side frame 2 and an upper portion of the foreside of the transmission 11b in the powerplant 11 and between the lower-right side frame 2 and a lower-right portion of the rear side of the transmission 11b in the powerplant 11 as seen from the front.

Also in the present embodiment, oblique bars 33 are additionally provided to the coupling members for coupling the leading ends of the plurality of side frames 2 to each other, so as to couple the leading ends of the side frames 2 on the upper side and substantially central portions in the longitudinal direction of the longitudinal bars 32 adjacent to the side frames.

The side frames 2 on the upper side of the present embodiment have intermediate portions thereof in the fore-and-aft direction of the car body supported by links 26E attached to the cabin 10a in a suspended manner. Further, the side frames 2 have intermediate portions thereof in the fore-and-aft direction of the car body supported by links 26F attached to the cabin 10a in such a manner as to be drawn inwardly in the width direction of the car body. The side frames 2 on the lower side of the present embodiment have intermediate portions thereof in the fore-and-aft direction of the car body supported by links 26G attached to the side frames 2 on the upper side in a suspended manner by means of the attachment openings 20. The links 26E to 26G have a similar structure to that of the links 26 in the first embodiment. In the present embodiment, brackets 55 of the links 26 on the side of the cabin 10a are attached to the cabin 10a with adjusters 56 interposed therebetween, the adjusters 56 having a similar structure to that of the side frame adjusters 25.

Effects similar to those of the first embodiment are obtainable from the general-purpose frame structure 1 for mounting powerplants of the present embodiment.

It is to be noted that the present invention is not limited to the foregoing embodiments. For example, appropriate changes and modifications may be made without departing from the scope of the invention to embody the present invention as follows:

(1) To mount the general-purpose frame structure of the present invention at the rear end of the cabin 10a.
(2) To fit to-be-attached members by using three or more attachment openings 20.
(3) The powerplant 11 is not specifically limited inasmuch as it is capable of driving a vehicle. Hence, power sources for the powerplant 11 are not limited to engines 11a driven by fuels, e.g., gasoline, gas oil, or hydrogen, and may be, for example, electric motors and hybrid engines including an engine and a motor.
(4) To adapt the brackets 4 to be fitted into a plurality of attachment openings 20. In this case, the recesses 21 and the projections 22 serving as anti-rotation means may be eliminated.
(5) To adapt each bracket 4 to be fitted in one attachment opening 20 and also to eliminate the projections 22 serving as anti-rotation means. In this manner, where prevention of rotation of the brackets 4 need not be considered, e.g., where the links 26 are provided, the brackets 4 may be attached in any orientation relative to the respective central axes of the attachment openings 20.
(6) To appropriately modify the attachment structure for to-be-attached members in the brackets 4. The structure may be appropriately modified according to the to-be-attached members, for example, in such a manner as to provide one sidewall 5 each.
(7) The present invention is applicable to vehicles in which both powerplant 11 and driving wheels are mounted in a front portion or a rear portion of the car body 10. Thus, in addition to the FF type vehicles as described in connection with the foregoing embodiments, the present invention is applicable to rear engine/rear drive (RR) type vehicles and midship engine/rear drive (MR) type vehicles.

DESCRIPTION OF REFERENCE SIGNS 1 general-purpose frame structure
2 side frame
3 mounting device
4 bracket
10 car body
10a cabin
10a' reinforcing panel
11 powerplant
11a engine
11b transmission
12 wheel
20 attachment opening
21 recess
22 projection
25 side frame adjuster
26 link
27 turnbuckle portion
27a pipe portion
27b, 27c external thread
28 spherical slide bearing portion
30, 31 lateral bar
32 longitudinal bar
33 oblique bar
35 base portion
36 spacer portion
37 slide portion
38 guide groove
39 slider
40 shaft
41 powerplant-side connection portion
42 side frame-side connection portion
43 mounting device adjuster
44 damper portion
45 insulator
46 internal shaft
47 outer casing
50 suspension
51 upper arm
52 lower arm
53 shock absorber
55 bracket
56 adjuster

The invention claimed is:

1. A general-purpose frame structure for mounting powerplants that is configured to mount a powerplant to a car body, the frame structure comprising:
  four side frames having basal ends thereof to be attached to a fore end or a rear end of a cabin of the car body, the side frames being adapted to extend in a fore-and-aft direction of the car body on a substantially upper-left side, on a substantially lower-left side, on a substantially upper-right side, and on a substantially lower-right side of the powerplant;
  a plurality of mounting devices to be interposed between the side frames and the powerplant to support the powerplant to the four side frames; and
  a bracket for attaching, to an associated one of the side frames, a portion to be attached to the side frame in a link configured to couple the side frame with the cabin, a portion to be attached to the side frame in a link configured to couple the side frames to each other, or a portion to be attached to the side frame in a suspension to be installed to the side frame, wherein
  the side frames have surfaces provided with a plurality of attachment openings arranged at specific intervals in a row in a length direction of the side frames, and side frame adjusters are configured to be interposed between the cabin and the side frames for adjusting relative positions of the cabin and the side frames, the mounting devices are each configured to be fitted, at the side of an associated one of the side frames, into one or two or more attachment openings of the plurality of attachment openings, and mounting device adjusters are each configured to be interposed between a powerplant-side connection portion to be connected to the powerplant and a side frame-side connection portion to be connected to an associated one of the side frames, for adjusting relative positions of the connections portions, and the bracket is configured to be fitted into one or two or more attachment openings of the plurality of attachment openings.

2. The general-purpose frame structure for mounting powerplants according to claim 1, wherein the mounting device adjusters have spacers to be interposed between the powerplant-side connection portions and the side frame-side connection portions, in such a manner that the relative positions of the powerplant-side connection portions and the side frame-side connection portions are changeable according to the spacers.

3. The general-purpose frame structure for mounting powerplants according to claim 1, wherein the side frame adjusters have spacers to be interposed between the cabin and the side frames, in such a manner that the relative positions of the cabin and the side frames are changeable according to the spacers.

4. The general-purpose frame structure for mounting powerplants according to claim 1, wherein the side frame adjusters are configured to adjust the positions of the side frames in a width direction of the car body.

5. The general-purpose frame structure for mounting powerplants according to claim 1, to wherein the side frame adjusters have shafts adapted to extend in a direction substantially perpendicular to the fore-and-aft direction of the car body, in such a manner that the side frames are angularly adjustable about the shafts.

6. The general-purpose frame structure for mounting powerplants according to claim 1, further comprising coupling members for coupling leading ends of the plurality of side frames to each other.

* * * * *